US012724977B2

(12) United States Patent
Galvin

(10) Patent No.: US 12,724,977 B2
(45) Date of Patent: Sep. 1, 2026

(54) SYSTEM AND METHOD FOR ADAPTIVE COGNITIVE PROCESSING WITH CORRELATION-PRESERVED DATA

(71) Applicant: AtomBeam Technologies Inc., Moraga, CA (US)

(72) Inventor: Brian Galvin, Silverdale, WA (US)

(73) Assignee: ATOM BEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/424,188

(22) Filed: Dec. 18, 2025

(65) Prior Publication Data

US 2026/0236694 A1 Aug. 13, 2026

Related U.S. Application Data

(63) Continuation-in-part of application No. 19/401,186, filed on Nov. 25, 2025, which is a (Continued)

(51) Int. Cl.

| | |
|---|---|
| ***G06F 40/30*** | (2020.01) |
| ***G06F 16/332*** | (2025.01) |
| ***G06F 16/3329*** | (2025.01) |

(52) U.S. Cl.

CPC .......... *G06F 40/30* (2020.01); *G06F 16/3325* (2019.01); *G06F 16/3329* (2019.01)

(58) Field of Classification Search

CPC .. G06F 40/30; G06F 16/3325; G06F 16/3329; G06F 40/20; G06F 16/24552;

(Continued)

(56) References Cited

U.S. PATENT DOCUMENTS

| | | | |
|---|---|---|---|
| 4,780,718 | A | 10/1988 | Hudson et al. |
| 5,708,436 | A | 1/1998 | Loiz et al. |

(Continued)

FOREIGN PATENT DOCUMENTS

| | | | |
|---|---|---|---|
| EP | 3364212 | A1 | 8/2018 |
| GB | 2620921 | A | 1/2024 |
| WO | 2020104416 | A1 | 5/2020 |

OTHER PUBLICATIONS

Balaneshin-Kordan, Saeid et al; "Deep Neural Architecture for Multi-Modal Retrieval based on Joint Embedding Space for Text and Images", Association for Computing Machinery, Feb. 5-9, 2018, pp. 1-9, Marina Del Rey, CA, USA.

(Continued)

*Primary Examiner* — Yogeshkumar Patel

(74) *Attorney, Agent, or Firm* — GALVIN PATENT LAW LLC; Brian R. Galvin; Erin L. Johnston

(57) ABSTRACT

A system and method of compressing cognitive data, such as command trajectories, operator interaction histories, and geometric structures, while preserving the spatial and semantic relationships required for reasoning and decision-making. The system allows trajectory calculations, geodesic measurements, and other cognitive operations to be performed directly on the compressed data without decompression. Compressed cognitive states are shared across multiple processing nodes using synchronization protocols that preserve the structure of the underlying manifold. Correlation networks are used to restore relationships that may be partially lost during compression. The system learns how to optimize compression strategies based on performance requirements and adapts over time. It also monitors the accuracy of cognitive operations and adjusts fidelity levels to maintain reliable output. This approach enables efficient, (Continued)

distributed cognitive computing where compressed data can still support advanced reasoning tasks.

20 Claims, 8 Drawing Sheets

Related U.S. Application Data continuation-in-part of application No. 19/399,611, filed on Nov. 24, 2025, which is a continuation-in-part of application No. 19/397,844, filed on Nov. 21, 2025, which is a continuation-in-part of application No. 19/379,579, filed on Nov. 4, 2025, which is a continuation-in-part of application No. 19/378,949, filed on Nov. 4, 2025, which is a continuation-in-part of application No. 19/377,013, filed on Nov. 2, 2025, which is a continuation-in-part of application No. 19/352,457, filed on Oct. 7, 2025, which is a continuation-in-part of application No. 19/321,173, filed on Sep. 6, 2025, now Pat. No. 12,602,549, which is a continuation-in-part of application No. 19/284,115, filed on Jul. 29, 2025, which is a continuation of application No. 19/051,193, filed on Feb. 12, 2025, now Pat. No. 12,387,050, said application No. 19/352,457 is a continuation-in-part of application No. 19/038,801, filed on Jan. 28, 2025, which is a continuation of application No. 18/818,593, filed on Aug. 29, 2024, now Pat. No. 12,308,862, application No. 19/424,188 is a continuation-in-part of application No. 18/755,627, filed on Jun. 26, 2024, now Pat. No. 12,200,102, said application No. 18/818,593 is a continuation-in-part of application No. 18/657,719, filed on May 7, 2024, now Pat. No. 12,166,506, which is a continuation-in-part of application No. 18/423, 287, filed on Jan. 25, 2024, now Pat. No. 12,218,696, which is a continuation of application No. 18/501, 987, filed on Nov. 4, 2023, now Pat. No. 11,967,974, which is a continuation-in-part of application No. 18/190,044, filed on Mar. 24, 2023, now Pat. No. 11,831,343, which is a continuation-in-part of application No. 17/875,201, filed on Jul. 27, 2022, now Pat. No. 11,700,013, which is a continuation of application No. 17/514,913, filed on Oct. 29, 2021, now Pat. No. 11,424,760, which is a continuation-in-part of application No. 17/404,699, filed on Aug. 17, 2021, now Pat. No. 11,385,794, said application No. 17/875,201 is a continuation of application No. 17/458,747, filed on Aug. 27, 2021, now Pat. No. 11,422,978.

(58) Field of Classification Search
CPC ............... G06F 16/2428; G06F 16/248; G06F 2214/454; G06F 3/14; G06F 3/015
See application file for complete search history.

(56) References Cited

U.S. PATENT DOCUMENTS 7,411,540 B1 8/2008 Lopez et al.
7,629,922 B2 12/2009 Winstead et al.
7,876,257 B2 1/2011 Vetro et al.
9,524,392 B2 12/2016 Naehrig et al.
10,346,043 B2 7/2019 Golden et al.
11,451,242 B2 9/2022 Choi et al.
11,656,353 B2 5/2023 Li et al.
11,915,690 B1 2/2024 Chang et al.
2004/0017307 A1 1/2004 Cirillo et al.
2004/0160353 A1 8/2004 Cirillo et al.
2008/0231504 A1 9/2008 Sartor et al.
2011/0012778 A1 1/2011 Nguyen et al.
2015/0054678 A1 2/2015 Wakayama
2017/0048537 A1 2/2017 Boufounos et al.
2018/0196609 A1 7/2018 Niesen
2020/0128307 A1 4/2020 Li
2020/0258296 A1 8/2020 Pennings et al.
2020/0272605 A1 8/2020 More
2020/0404340 A1 12/2020 Xu et al.
2021/0027862 A1* 1/2021 Wei ........................ G06N 20/00
2022/0156631 A1 5/2022 Kanso et al.
2022/0164343 A1* 5/2022 Lee ........................ G06N 3/094
2022/0246158 A1 8/2022 Nam et al.
2022/0404490 A1 12/2022 Evans et al.
2023/0131694 A1 4/2023 Saber et al.
2023/0169623 A1 6/2023 Chen et al.
2023/0177281 A1* 6/2023 Kamath ................. G06N 3/091 704/2
2023/0184927 A1 6/2023 Chen et al.
2023/0229722 A1* 7/2023 Ishii ........................ G06F 40/20 345/419
2024/0185037 A1 6/2024 Park et al.
2024/0195438 A1 6/2024 Isik et al.
2025/0259043 A1* 8/2025 Crabtree ................ G06N 3/047
2025/0259085 A1* 8/2025 Crabtree ................ G06N 5/043
2025/0306680 A1* 10/2025 Zhou ....................... G06F 3/015

OTHER PUBLICATIONS

Cai, Yuanhao et al; "Mask-guided Spectral-wise Transformer for Efficient Hyperspectral Image Reconstruction", Conference on Computer Vision and Pattern Recognition, pp. 17502-17511, 2022.
Cai, Yuanhao et al; "MST++: Multi-stage Spectral-wise Transformer for Efficient Spectral Reconstruction", Conference on Computer Vision and Pattern Recognition, 2022.
Gim, In, et al; "Prompt Cache: Modular Attention Reuse for Low-Latency Inference", arXiv:2311.04934v2, Apr. 2024.
He, Kaiming et al; "Deep Residual Learning for Image Recognition", Conference on Computer Vision and Pattern Recognition, pp. 770-778, 2016.
Khan, Abdul Rafae, et al; "Coding Textual Inputs Boosts the Accuracy of Neural Networks", 2020 Conference on Empirical Methods in Natural Language Processing, Nov. 16-20, 2020, pp. 1350-1360.
Messina, Nicola et al; "Towards Efficient Cross-Modal Visual Textual Retrieval using Transformer-Encoder Deep Features", 2021 International Conference on Content-Based Multimedia Indexing, 2021, pp. 1-6, United States.
Seo, Beomsoek et al; "How Does a Transformer Learn Compression? An Attention Study on Huffman and LZ4", Department of Electronic and Electrical Engineering, Dec. 12, 2023, vol. 11, Seoul, South Korea.
Vaswani, Ashish, et al; "Attention is All You Need", arXiv:1706.03762v7, Aug. 2023.
Wang, Tianming, & Wan, Xiaojun; "T-CVAE: Transformer-based conditioned variational autoencoder for story completion", Proceedings of the Twenty-Eighth Joint Conference on Artificial Intelligence, pp. 5233-5239, 2019.
Wieting, John et al; "A Bilingual Generative Transformer for Semantic Sentence Embedding", arXiv:1911.03895v2, Nov. 2020.

* cited by examiner

SYSTEM AND METHOD FOR ADAPTIVE COGNITIVE PROCESSING WITH CORRELATION-PRESERVED DATA

CROSS-REFERENCE TO RELATED APPLICATIONS

Priority is claimed in the application data sheet to the following patents or patent applications, each of which is expressly incorporated herein by reference in its entirety:

Ser. No. 19/401,186
Ser. No. 19/399,611
Ser. No. 19/397,844
Ser. No. 19/379,579
Ser. No. 19/378,949
Ser. No. 19/377,013
Ser. No. 19/352,457
Ser. No. 19/321,173
Ser. No. 19/284,115
Ser. No. 19/051,193
63/847,082
63/847,091
63/847,096
63/847,101
63/847,969
Ser. No. 19/038,801
Ser. No. 18/818,593
Ser. No. 18/755,627
Ser. No. 18/657,719
Ser. No. 18/423,287
Ser. No. 18/501,987
Ser. No. 18/190,044
Ser. No. 17/875,201
Ser. No. 17/514,913
Ser. No. 17/404,699
Ser. No. 17/458,747
Ser. No. 16/923,039
63/027,166
Ser. No. 16/716,098
63/388,411
Ser. No. 17/727,913
Ser. No. 18/410,980
Ser. No. 18/537,728
Ser. No. 18/657,683
Ser. No. 18/648,340
Ser. No. 18/427,716
Ser. No. 19/326,730
63/847,889
Ser. No. 19/245,366
Ser. No. 19/204,525
Ser. No. 19/192,215
Ser. No. 18/972,797
Ser. No. 18/648,340
Ser. No. 19/328,094
Ser. No. 19/363,675
Ser. No. 19/351,286
Ser. No. 19/329,330
Ser. No. 19/003,258
Ser. No. 18/822,203
Ser. No. 19/315,849
Ser. No. 19/294,125
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
63/651,359
Ser. No. 19/178,873
Ser. No. 19/177,611
Ser. No. 18/887,424
Ser. No. 18/810,505
Ser. No. 18/627,451

BACKGROUND OF THE INVENTION

Field of the Art

The present invention relates to the field of artificial intelligence and cognitive computing, and more specifically to systems for compressed cognitive data processing that preserve geometric and semantic structure for distributed reasoning.

Discussion of the State of the Art

In recent years, artificial intelligence systems have advanced significantly in their ability to perform complex reasoning, natural language understanding, and spatial decision-making. Many of these systems rely on latent manifolds, geometric data representations, or high-dimensional embeddings to model cognitive states, user intent, and command sequences. Distributed cognitive architectures, including federated learning systems and multi-agent frameworks, have been developed to allow AI agents to share knowledge and collaborate across networks. Compression techniques, including autoencoders and latent-space encodings, are commonly used to reduce bandwidth and storage requirements in such systems.

However, traditional compression methods often discard the spatial and semantic correlations that are essential for cognitive operations like geodesic computation, trajectory prediction, and manifold traversal. When cognitive data is compressed for transmission or storage, the underlying geometric relationships are frequently lost or distorted, making it difficult or impossible for distributed systems to reason accurately using the compressed representations. This results in degraded performance, increased error rates, and an inability to synchronize complex reasoning tasks across multiple cognitive nodes. Existing solutions typically rely on full decompression prior to computation, which introduces latency, increases resource demands, and limits scalability.

What is needed is a system and method that enables distributed cognitive processing directly on compressed data while preserving the geometric and semantic relationships essential for manifold-based reasoning and trajectory computation.

SUMMARY OF THE INVENTION

The inventor has conceived and reduced to practice a computer system and method for adaptive cognitive processing using correlation-preserved data compression. This invention enables distributed cognitive systems to exchange and operate on compressed cognitive representations, such as command trajectories, operator interaction histories, and latent manifold structures, while preserving the geometric and semantic relationships required for spatial reasoning and geodesic trajectory computation. Through the use of specialized encoders, compressed-space reasoning engines, correlation recovery networks, and adaptive fidelity control mechanisms, the system maintains the structural integrity of latent manifolds under compression, thereby supporting efficient cognitive processing across networked environments without requiring decompression. The invention addresses the technical challenge of performing manifold-based reasoning on compressed cognitive data while supporting privacy-preserving federation and dynamic optimization of compression strategies.

In an embodiment, a computer system includes a hardware memory and is configured to execute software instructions stored on nontransitory machine-readable storage media to maintain a latent manifold as a geometric substrate for cognitive operations and command representation, wherein the latent manifold encodes system commands as nodes in geometric space with edges representing valid command sequences. The system compresses cognitive state data including command trajectories, operator interaction histories, and manifold structural parameters using correlation-preserving encoders that maintain geometric relationships essential for cognitive operations. A compressed cognitive processing engine performs trajectory computations, geodesic distance calculations, and spatial reasoning operations directly on compressed cognitive representations without requiring decompression. The system maintains distributed synchronization of compressed cognitive states across multiple processing nodes while preserving geometric manifold properties through correlation-aware federation protocols. Geometric fidelity of cognitive operations is restored by applying correlation networks to compressed cognitive data, wherein the correlation networks recover spatial relationships and semantic dependencies lost during compression. Compression parameters are adapted based on cognitive processing requirements, wherein the system learns optimal correlation preservation strategies for different types of geometric manifold operations. The system validates semantic integrity of compressed cognitive operations by monitoring preservation of geometric relationships and adjusting compression fidelity when cognitive accuracy thresholds are not maintained.

In an aspect of an embodiment, the correlation-preserving encoders comprise specialized geometric encoders that preserve manifold curvature and geodesic distance relationships during compression of command trajectory data.

In an aspect of an embodiment, the compressed cognitive processing engine performs trajectory computations directly in compressed latent space while maintaining geometric consistency equivalent to uncompressed manifold operations.

In an aspect of an embodiment, the distributed synchronization implements bandwidth-adaptive compression protocols that adjust correlation preservation strategies based on network transmission constraints.

In an aspect of an embodiment, the correlation networks implement cross-modal correlation analysis to restore spatial relationships between compressed command trajectories and compressed operator context data.

In an aspect of an embodiment, the compression parameter adaptation uses reinforcement learning algorithms to optimize correlation preservation based on cognitive operation accuracy feedback.

In an aspect of an embodiment, the semantic integrity validation implements geometric fidelity metrics that quantify preservation of manifold properties and trigger adaptive decompression when accuracy thresholds are not maintained.

In an aspect of an embodiment, the system further implements privacy-preserving transformations that enable secure sharing of compressed cognitive patterns between distributed processing nodes while maintaining geometric properties necessary for spatial reasoning operations.

In an aspect of an embodiment, the specialized geometric encoders implement constraint-based loss functions that penalize geometric distortion to maintain local neighborhood structures essential for cognitive manifold operations.

In an aspect of an embodiment, the system adapts compression strategies based on operator-specific cognitive processing patterns learned from historical interaction data to optimize correlation preservation for individual cognitive workflows.

In an embodiment, the method aspects of the above computer-implemented system include maintaining a latent manifold for cognitive operations and command representation, compressing cognitive state data using correlation-preserving encoders that retain geometric structure, and performing spatial reasoning operations including trajectory computations and geodesic calculations directly on compressed cognitive representations. The method further includes synchronizing compressed cognitive states across distributed processing nodes while preserving manifold structure, restoring spatial and semantic fidelity using correlation networks, adapting compression parameters based on learned processing requirements, and validating the geometric and semantic integrity of compressed cognitive operations by monitoring structural consistency and adjusting fidelity when required.

BRIEF DESCRIPTION OF THE DRAWING FIGURES

DETAILED DESCRIPTION OF THE INVENTION

Figure 1:
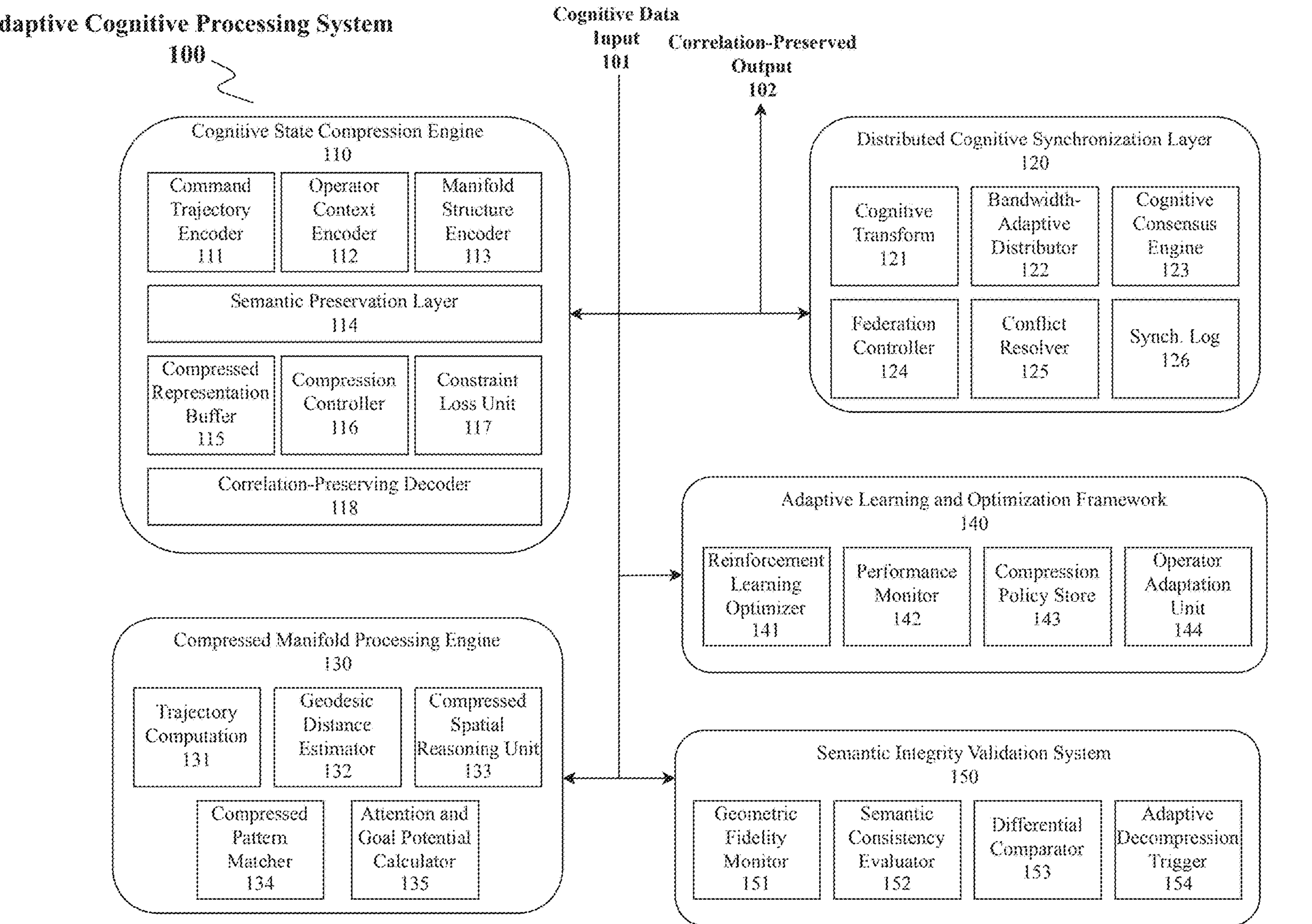
FIG. 1 is a block diagram illustrating an exemplary system architecture of an adaptive cognitive processing system with correlation-preserved data compression, showing major subsystems including a cognitive state compression engine, distributed synchronization layer, compressed manifold processing engine, semantic integrity validation system, and adaptive learning and optimization framework.

The inventor has conceived and reduced to practice a system and method for adaptive cognitive processing with correlation-preserved data compression. In an embodiment, the system enables distributed cognitive systems to operate directly on compressed cognitive representations while preserving the geometric and semantic relationships that support manifold-based reasoning, trajectory computation, and distributed command interpretation.

This disclosure integrates multiple technical approaches into a unified system architecture. In an embodiment, the system provides compression that not only reduces data size but also exploits correlations between inputs to improve reconstruction and restore lost information. Compressed representations may be structured so that useful operations, such as distance estimation or trajectory calculation, can be carried out in latent space without the need for decompression. In addition, latent manifolds may serve as geometric substrates for cognitive operations, where commands may be represented as nodes and valid sequences may be represented as trajectories through the space. The architecture therefore combines correlation-preserving compression, latent-space operation, and manifold-based reasoning into a single framework that maintains geometric integrity while supporting distributed synchronization and adaptive processing.

In an embodiment, a cognitive state compression engine may encode operator command trajectories, operator interaction histories, and manifold structural parameters into correlation-preserved latent representations. Like prior autoencoder architectures, this engine may use layered encoders and decoders, but here the encoders are trained with additional correlation-preserving objectives. These objectives penalize geometric distortion so that distances between related points, neighborhood structures, and manifold curvature remain consistent before and after compression. In this way, compressed data may still support geodesic computations, similarity measurements, and predictive trajectory modeling.

In an embodiment, compressed data may then be processed directly by a manifold processing subsystem. As taught in the homomorphic compression disclosure, operations may be performed in latent space without first restoring the original data. In this system, trajectory computations may be approximated by applying shortest-path algorithms to graphs constructed in compressed space, where edge weights are derived from preserved geometric distances. Distance estimation may be performed by applying modified distance functions or kernel-based interpolation techniques to latent coordinates. Because the compression engine has preserved sufficient structure, operations performed in compressed space approximate those that would be performed in the uncompressed manifold with a defined error bound.

In an embodiment, distributed cognitive synchronization may extend the principles of the cognitive middleware disclosure. Compressed cognitive representations may be transmitted between processing nodes using privacy-preserving transformations that obscure operator-specific details while maintaining the manifold geometry. A consensus engine may validate updates, a federation controller may coordinate update scheduling, and conflict resolution mechanisms may reconcile inconsistent manifold deltas across nodes. By transmitting correlation-preserved compressed states rather than raw or decompressed states, bandwidth demands are reduced and synchronization fidelity is maintained.

In an embodiment, a semantic integrity validation subsystem may monitor whether compressed operations remain consistent with uncompressed equivalents. Quality metrics may be defined that measure distortion of geodesic distances, trajectory deviation, and semantic interpretation consistency. When distortion exceeds acceptable ranges, adaptive decompression procedures may be triggered for critical components. Validation results may also be reported to an adaptive learning subsystem.

In an embodiment, an adaptive learning and optimization framework may apply reinforcement learning to continuously tune compression and processing policies. A reward function may balance cognitive accuracy against computational and bandwidth efficiency. Operator-specific patterns and preferences may also be incorporated, allowing the system to bias compression strategies toward preserving the most important correlations for a given operator's workflow. In this way, the framework learns to improve compression over time while adapting to both system-level and operator-specific requirements.

Performance bounds may be established to ensure equivalence between compressed-space and uncompressed operations. For example, the system may specify that geodesic calculations in compressed space must deviate from uncompressed results by less than a defined percentage across benchmark datasets. Curvature preservation and semantic accuracy may be subject to similar quantitative thresholds. These bounds provide assurance that compressed-space operations approximate the accuracy of uncompressed manifold operations within acceptable tolerances.

By integrating autoencoder-style correlation preservation, variational latent space operations, and distributed manifold-based command mediation, the present invention extends each of the three parent disclosures. The result is a comprehensive system that enables distributed cognitive agents to exchange and reason over compressed cognitive data while maintaining geometric and semantic integrity. This approach reduces bandwidth requirements, improves synchronization, and enables continuous adaptation, thereby providing technical advantages not available in any of the parent systems alone.

In an embodiment, correlation-preserving encoders may be trained with objective functions that penalize distortion of manifold geometry. The loss functions may include terms that measure differences between distances in compressed space and distances in the original manifold, as well as terms that measure differences between curvature estimates. A weighting factor may be applied to balance distance preservation and curvature preservation. For example, one factor may place greater emphasis on distance consistency, while another factor may emphasize curvature fidelity. Typical values for these weights may range from one to ten, though in some embodiments higher ratios may be selected when particular aspects of geometry are critical for cognitive operations.

In an embodiment, trajectory computations may be supported by constructing a graph directly in compressed latent space. Nodes of the graph may correspond to compressed data points or compressed states that represent cognitive positions. Edges may be formed between nodes that are within a neighborhood radius, for example the k nearest neighbors of each node. Edge weights may be computed based on preserved geometric distances between the compressed nodes, possibly adjusted with correction factors learned during training. This graph topology may reflect the topology of the original manifold, such that shortest paths in compressed space approximate geodesic paths in the original space.

Distance estimation in compressed space may be performed using functions that account for compression artifacts. For example, a modified distance function may apply a scaling factor to latent-space Euclidean distance to correct for shrinkage or stretching introduced by compression. In another embodiment, a kernel-based interpolation method may be applied, where a smoothing kernel such as a Gaussian, polynomial, or radial basis kernel is used to approximate true geodesic length from local neighborhoods. Kernel widths may be selected empirically, for example between 0.05 and 0.2 in normalized latent units, depending on the density of training data.

In an embodiment, the system may analyze how errors propagate through the compression and processing pipeline. Compression errors may introduce distortions in distance calculations, which in turn may affect trajectory computations. When operations are chained, such as compression followed by manifold processing followed by decompression, the system may track cumulative error by measuring deviation at each stage. For example, geodesic deviation introduced during compression may compound with interpolation error during trajectory estimation, and the total error may be expressed as the sum of these contributions. The semantic integrity validation subsystem may monitor cumulative deviation to ensure that chained errors remain within acceptable tolerances.

In an embodiment, the semantic integrity validation subsystem may enforce specific quality thresholds. Geodesic deviation may be required to remain below three percent for distances greater than one tenth of a manifold unit. Curvature preservation accuracy may be required to exceed ninety-five percent across benchmark datasets. Semantic interpretation consistency, measured by comparing intended operator commands to recognized outcomes across cycles, may be required to maintain at least ninety-seven percent accuracy. Thresholds may be configurable based on application requirements, but the presence of defined metrics ensures that compressed operations remain functionally equivalent to uncompressed operations within a bounded tolerance.

In an embodiment, validation testing may be performed on benchmark datasets that include diverse cognitive operations, varying manifold complexities, and representative operator interaction patterns. For example, test data may include command sequences mapped as trajectories through synthetic manifolds, operator preference vectors with temporal dynamics, and high-dimensional manifold structures such as those found in hyperspectral data or simulation environments. Benchmark manifolds may range from low-dimensional surfaces with simple curvature to high-dimensional spaces with complex topologies. Operator interaction datasets may include sequences of natural language commands, gesture-based control patterns, or task-oriented decision flows.

In an embodiment, the adaptive learning and optimization framework may apply reinforcement learning with defined convergence criteria. The framework may employ a learning rate parameter that controls how quickly compression policies are updated in response to new feedback. In some embodiments, learning rates between 0.001 and 0.01 may provide stable adaptation without oscillation. Convergence may be assessed by monitoring whether reward values stabilize over multiple epochs of feedback. Stability guarantees may be enforced by limiting the magnitude of parameter updates per cycle and by applying regularization techniques such as weight decay or gradient clipping. In this way, the adaptive learning subsystem ensures that compression parameters converge toward stable values while continuously improving system performance.

In a non-limiting use case example, the system may be applied to real-time event detection in oilfield operations. Oilfield environments typically deploy large networks of distributed sensors, including pressure sensors, flow meters, vibration monitors, and acoustic detectors. These sensors generate continuous streams of high-dimensional data that must be transmitted to supervisory systems for safety monitoring and operational optimization. Traditional compression approaches may reduce transmission volume but risk losing critical correlations between signals, such as the relationship between pressure fluctuations and acoustic anomalies that precede a blowout or equipment failure.

Using correlation-preserved cognitive compression, sensor data may be encoded into compact latent representations that maintain geometric relationships between correlated sensor streams. For example, pressure waveforms from downhole sensors may be compressed in a manner that retains their geodesic similarity to simultaneously recorded acoustic signals, enabling accurate detection of joint anomalies in compressed space. In this arrangement, correlation-preserving encoders may be trained with loss functions that penalize distortion of cross-sensor relationships, so that patterns involving multiple sensor modalities remain interpretable after compression.

Compressed representations may be transmitted through a distributed synchronization layer to cloud-based or edge-based supervisory nodes. Privacy-preserving transformations may obscure operator-specific drilling strategies while preserving the geometric manifold that encodes relationships between sensor streams. Bandwidth-adaptive distribution may adjust compression granularity in real time based on available satellite or line-of-sight transmission capacity, ensuring that critical updates are delivered even in constrained communication environments.

Within the compressed manifold processing engine, supervisory nodes may compute trajectories representing evolving sensor states directly in compressed space. For example, a trajectory may represent how pressure-acoustic correlation shifts as a well approaches a critical operating condition. Geodesic distance calculations may identify when current sensor states diverge from historically safe operating regimes by more than an allowable margin. Pattern matching in compressed space may quickly detect that the combination of vibration and flow rate signals corresponds to a previously observed precursor to equipment failure.

The semantic integrity validation subsystem may enforce quantitative thresholds to ensure safety-critical fidelity. For example, geodesic deviation between compressed and uncompressed sensor trajectories may be required to remain below three percent for distances representing pressure changes greater than 0.1 megapascals, while cross-modal correlation preservation accuracy may be required to exceed ninety-five percent when comparing acoustic-pressure signal pairs. If these conditions are not met, adaptive decompression may selectively decode the most critical sensor streams, such as high-frequency vibration channels, to restore full precision for imminent event detection.

The adaptive learning and optimization framework may adjust compression strategies based on observed operating conditions. For example, when the system detects that certain wells routinely generate strong cross-correlations between pressure and acoustic data, reinforcement learning may bias encoder parameters toward preserving these relationships more aggressively. Conversely, when communication bandwidth is constrained, the framework may adapt by relaxing preservation of less critical modalities, such as low-variability temperature readings, while still meeting defined fidelity thresholds for event detection.

By applying correlation-aware compression in this context, the system enables real-time detection of safety-critical oilfield events such as blowout precursors, equipment fatigue, or unexpected formation influx, while significantly reducing the communication bandwidth required to transmit continuous sensor data. This provides a technical advantage by allowing distributed supervisory nodes to perform manifold-based reasoning directly on compressed data, maintaining both efficiency and fidelity in environments where rapid response and data integrity are paramount.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "geodesic distance" refers to the shortest path length between two points measured along the surface or structure of a manifold, as opposed to a straight-line distance through ambient space.

As used herein, "geodesic deviation" refers to the difference between a distance measured along a manifold in compressed space and the corresponding distance measured in uncompressed space, often expressed as a percentage error.

As used herein, "local neighborhood structure" refers to the set of data points within a defined proximity of a given point on a manifold, where the relative arrangement of these neighbors provides geometric or semantic context.

As used herein, "manifold curvature" refers to a measure of how a manifold bends or deviates from flatness at a given point, which may be estimated by examining how geodesics spread or converge in the local neighborhood of that point.

As used herein, "correlation preservation" refers to the retention of statistical, geometric, or semantic relationships between data elements during compression, such that compressed representations maintain the relative patterns of the original data.

As used herein, "constraint-based loss function" refers to a training objective that penalizes distortion of geometric or semantic properties, including distance errors, curvature mismatches, or broken neighborhood relationships, when generating compressed representations.

As used herein, "modified distance function" refers to a distance calculation method that adjusts a standard metric, such as Euclidean distance, with correction terms or scaling factors to account for distortions introduced by compression.

As used herein, "kernel-based interpolation" refers to a method of estimating values or distances in compressed space by applying weighting functions, such as Gaussian or radial basis kernels, to local neighborhoods of data points.

As used herein, "error propagation" refers to the process by which distortions or inaccuracies introduced during compression influence subsequent operations, such as trajectory computation, pattern matching, or decompression.

As used herein, "quality threshold" refers to a defined quantitative limit beyond which compressed-space operations are considered unreliable, such as a maximum allowable percentage of geodesic deviation or a minimum required semantic consistency score.

As used herein, "semantic consistency" refers to the degree to which compressed and uncompressed operations yield equivalent interpretations of commands, trajectories, or operator intent.

As used herein, "benchmark dataset" refers to a set of test data used to evaluate system fidelity and performance, which may include synthetic manifolds of varying curvature, multimodal sensor streams, or operator interaction histories.

As used herein, "reinforcement learning convergence" refers to the condition where iterative updates to compression or processing policies stabilize within bounded error ranges, ensuring that continued adaptation improves performance without oscillation or divergence.

As used herein, "fidelity metric" refers to a quantitative measure of how well a compressed operation approximates its uncompressed equivalent, which may include distance preservation, curvature preservation, trajectory alignment, or semantic interpretation accuracy.

As used herein, "accuracy tolerance" refers to a maximum allowable deviation between results obtained in compressed space and results obtained in uncompressed space, often expressed as a percentage error or a statistical confidence interval.

As used herein, "safety limit" refers to a threshold beyond which the reliability of compressed cognitive operations is considered insufficient for continued processing without decompression, such as a maximum geodesic distortion percentage or a minimum semantic consistency score.

As used herein, "performance bound" refers to a defined quantitative range within which compressed cognitive operations are guaranteed to approximate uncompressed operations, including limits on error accumulation, convergence speed, and stability of reinforcement learning updates.

As used herein, "geometric fidelity" refers to the degree to which compressed representations preserve structural properties of a manifold, including distances, curvature, and neighborhood relationships.

As used herein, "semantic fidelity" refers to the degree to which compressed operations preserve the meaning or intent of cognitive inputs, such as command interpretation accuracy or consistency of operator preference recognition.

As used herein, "validation threshold" refers to a configured cutoff used by a quality monitoring subsystem to determine whether compressed-space results remain acceptable, which may be defined for individual metrics such as distance deviation, curvature accuracy, or semantic consistency.

As used herein, "convergence condition" refers to a defined set of criteria used to determine when an adaptive learning process has stabilized, such as error rates falling below a specified bound over a defined number of update cycles.

As used herein, "stability guarantee" refers to a condition in which iterative adaptation processes, such as reinforcement learning updates to compression parameters, are mathematically or empirically shown to avoid divergence, oscillation, or uncontrolled error growth.

Conceptual Architecture of an Adaptive Cognitive Processing System

FIG. 1 is a block diagram illustrating exemplary architecture of an adaptive cognitive processing system with correlation-preserved data compression. A system 100 receives cognitive input data 101 generated by a persistent cognitive machine and outputs correlation-preserved cognitive state 102 for use by the persistent cognitive machine. System 100 comprises, in the illustrated embodiment, a cognitive state compression engine 110, a distributed cognitive synchronization layer 120, a compressed manifold processing engine 130, an adaptive learning and optimization framework 140, and a semantic integrity validation system 150, arranged to maintain geometric and semantic relationships during compression, sharing, and processing.

Cognitive input data 101 is received into cognitive state compression engine 110. Cognitive state compression engine 110 includes a command trajectory encoder 111 that encodes geometric paths associated with command sequences, an operator context encoder 112 that encodes temporal interaction patterns and preference vectors, and a manifold structure encoder 113 that encodes manifold parameters including metric and curvature information. Outputs of encoders 111, 112, and 113 are processed by a semantic correlation preservation layer 114 that applies constraint-based objectives to preserve geodesic distances, local neighborhood structure, and cross-modal relationships. A compressed representation buffer 115 holds correlation-preserved latent representations for downstream use, while a compression controller 116 adjusts encoder configuration based on feedback. A constraint loss unit 117 evaluates geometric distortion against target tolerances during training or adaptation. A correlation-preserving decoder 118 produces selectively decompressed artifacts when required for integrity measurement, export, or compatibility with external subsystems. Cognitive state compression engine 110 forwards compressed cognitive representations from buffer 115 to distributed cognitive synchronization layer 120 and to compressed manifold processing engine 130.

Distributed cognitive synchronization layer 120 receives compressed cognitive representations and coordinates exchange between processing nodes. Distributed cognitive synchronization layer 120 includes a privacy-preserving cognitive transform 121 that applies differential geometric transformations to obscure operator-specific details while maintaining manifold relationships, a bandwidth-adaptive distributor 122 that adjusts compression granularity to current transport conditions, and a cognitive consensus engine 123 that validates and merges incoming compressed updates. A federation controller 124 manages peer discovery and update scheduling, while a conflict resolver 125 reconciles inconsistent manifold deltas. A synchronization log 126 records applied updates for auditability and rollback. Distributed cognitive synchronization layer 120 supplies accepted updates to compressed manifold processing engine 130 and provides applied-update notifications to adaptive learning and optimization framework 140.

Compressed manifold processing engine 130 performs cognitive operations directly on compressed representations. Compressed manifold processing engine 130 includes a trajectory computation unit 131 that computes paths corresponding to command intent in compressed space, a geodesic distance estimator 132 that evaluates similarity and proximity between compressed cognitive states, and a compressed spatial reasoning unit 133 that advances cognitive dynamics without decompression. A compressed pattern matcher 134 identifies prior patterns in compressed repositories to accelerate decision making, and an attention and goal potential calculator 135 operates in compressed space to guide trajectory selection. Outputs of compressed manifold processing engine 130 are supplied as compressed cognitive results to semantic integrity validation system 150 and to adaptive learning and optimization framework 140, and may be selectively decoded by decoder 118 when native representations are requested.

Adaptive learning and optimization framework 140 tunes compression and processing behavior using measured performance. Adaptive learning and optimization framework 140 includes a reinforcement learning optimizer 141 that selects compression policies to balance efficiency with cognitive accuracy, a performance monitor 142 that ingests accuracy and latency metrics from semantic integrity validation system 150 and compressed manifold processing engine 130, a compression policy store 143 that maintains task-specific and operator-specific profiles, and an operator adaptation unit 144 that biases preservation of relationships most predictive for a given operator's workflow. Adaptive learning and optimization framework 140 issues parameter updates to compression controller 116, adjustment directives to bandwidth-adaptive distributor 122, and weighting updates to attention and goal potential calculator 135.

Semantic integrity validation system 150 measures fidelity of compressed operations against geometric and semantic criteria. Semantic integrity validation system 150 includes a geometric fidelity monitor 151 that evaluates preservation of geodesic structure and local neighborhoods in compressed space, a semantic consistency evaluator 152 that assesses command interpretation consistency and intent preservation across compression cycles, and a differential comparator 153 that, when needed, compares compressed-space outcomes against selectively decompressed references produced by decoder 118. An adaptive decompression trigger 154 requests targeted decoding when compressed-space uncertainty exceeds configured thresholds. Semantic integrity validation system 150 emits quality assessments to adaptive learning and optimization framework 140 and may signal compression controller 116 and cognitive consensus engine 123 to adjust fidelity or merge thresholds.

During operation, cognitive input data 101 enters cognitive state compression engine 110, where encoders 111, 112, and 113 produce correlation-preserved latent representations conditioned by semantic correlation preservation layer 114 and recorded in compressed representation buffer 115. Compressed representations flow concurrently to distributed cognitive synchronization layer 120 for federation and to compressed manifold processing engine 130 for cognitive computations that include trajectory computation by unit 131, similarity evaluation by estimator 132, spatial reasoning by unit 133, pattern retrieval by matcher 134, and guidance by calculator 135. Semantic integrity validation system 150 continuously evaluates geometric and semantic fidelity using monitors 151 and 152 and comparator 153, issuing adaptive decompression requests through trigger 154 when direct comparison against decoded references is warranted. Adaptive learning and optimization framework 140 aggregates performance signals to update compression controller 116, distributor 122, and processing weights in compressed manifold processing engine 130. System 100 provides correlation-preserved cognitive state 102 as compressed outputs suitable for PCM ingestion, and, when requested, provides selectively decoded artifacts from decoder 118 to support execution, operator interaction, or archival workflows. In this arrangement, compressed representations remain usable for spatial reasoning and trajectory computation, while synchronization and validation maintain manifold integrity across distributed processing nodes.

Figure 2:
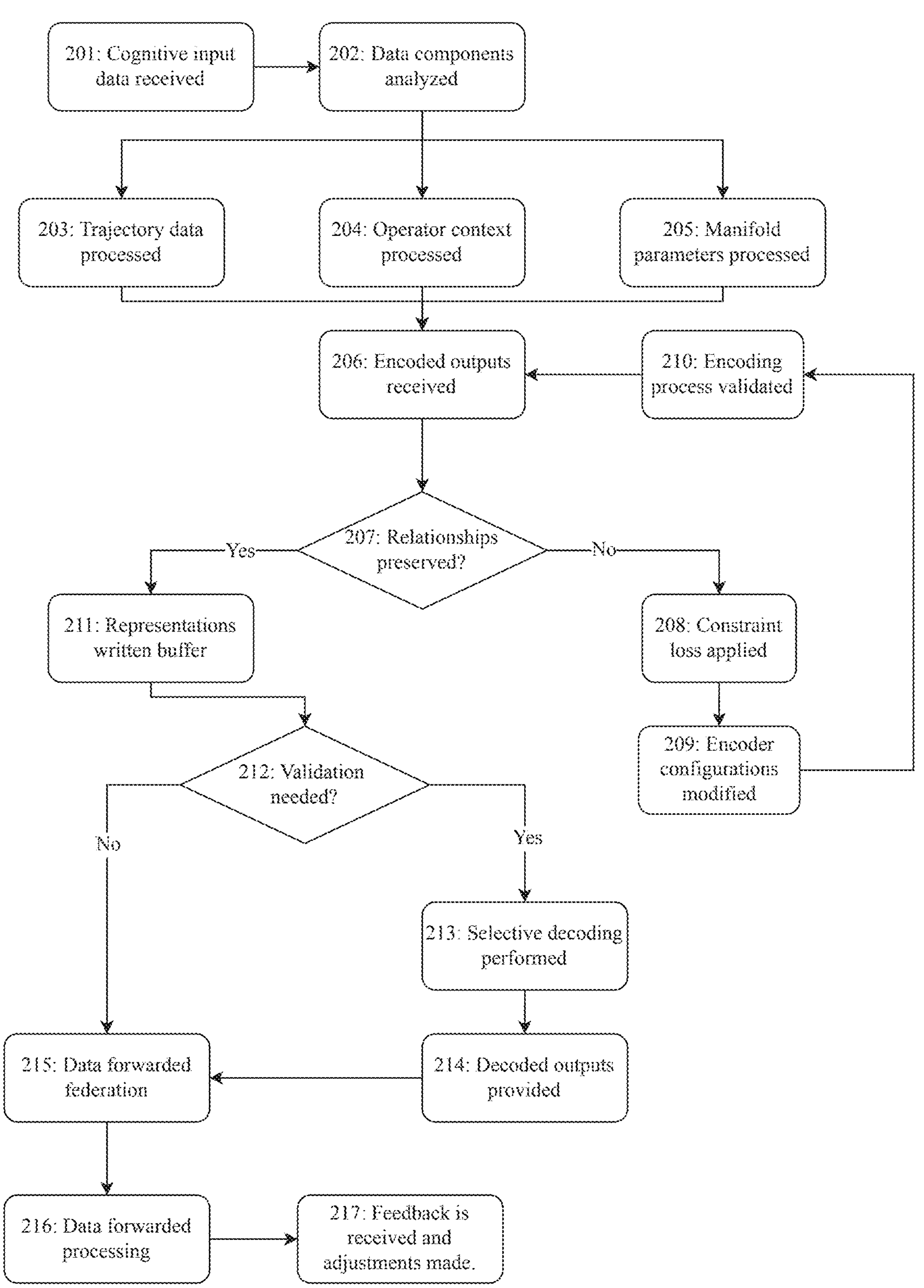
FIG. 2 is a flow diagram illustrating an exemplary method of correlation-preserved cognitive state compression, in which input data is processed through specialized encoders, correlation preservation is enforced, compressed representations are buffered, validation is optionally performed, and outputs are forwarded for federation and processing.

FIG. 2 is a flow diagram illustrating an exemplary method of correlation-preserved cognitive state compression in an adaptive cognitive processing system, in an embodiment. The method begins when the cognitive state compression engine 110 receives cognitive input data 101 from a persistent cognitive machine 201. The cognitive state compression engine 110 analyzes the received cognitive input data to identify its constituent components, which include command trajectories representing geometric paths through the latent manifold, operator interaction histories containing temporal patterns and behavioral data, and manifold structural parameters encompassing metric tensors and curvature information 202. The command trajectory encoder 111 processes command trajectory data by applying convolutional operations designed to preserve spatial continuity and geodesic properties 203. The operator context encoder 112 processes operator context data containing interaction histories and preference vectors utilizing temporal convolutional networks with attention mechanisms 204. The manifold structure encoder 113 processes manifold structural parameters including metric tensors, curvature measures, and connection data using graph neural networks for structural relationship preservation 205.

The semantic correlation preservation layer 114 receives encoded outputs from all three specialized encoders and applies constraint-based objectives to maintain essential geometric relationships 206. The semantic correlation preservation layer 114 evaluates whether critical geometric relationships, including geodesic distances and local neighborhood structures, are adequately preserved in the encoded representations 207. When geometric relationship preservation is determined to be insufficient, the constraint loss unit 117 applies constraint-based loss functions that penalize geometric distortion and calculate adjustment parameters 208. The compression controller 116 uses the calculated adjustment parameters to modify encoder configurations and weights to improve geometric relationship preservation 209. The encoding process is repeated with the adjusted parameters until geometric relationships meet preservation criteria as validated by the semantic correlation preservation layer 114 210.

When geometric relationships are successfully preserved, the semantic correlation preservation layer 114 directs the correlation-preserved encoded representations to be written to the compressed representation buffer 115 for storage and downstream access 211. The compression controller 116 determines whether validation checking is required based on quality assurance protocols and accuracy monitoring requirements 212. If validation is required, the correlation-preserving decoder 118 performs selective decoding to reconstruct partial representations for comparison against preservation criteria 213. The correlation-preserving decoder 118 outputs the selectively decoded representations for validation analysis or export to external systems requiring uncompressed formats 214. When validation is not required or has been completed successfully, the compressed representation buffer 115 forwards the compressed representations to the distributed cognitive synchronization layer 120 for federation across processing nodes 215. Simultaneously, the compressed representation buffer 115 also forwards the compressed representations to the compressed manifold processing engine 130 to enable direct cognitive operations on the compressed data 216. The compression controller 116 receives feedback from downstream processing components and adjusts encoder parameters to optimize future compression operations based on cognitive processing performance requirements 217.

Figure 3:
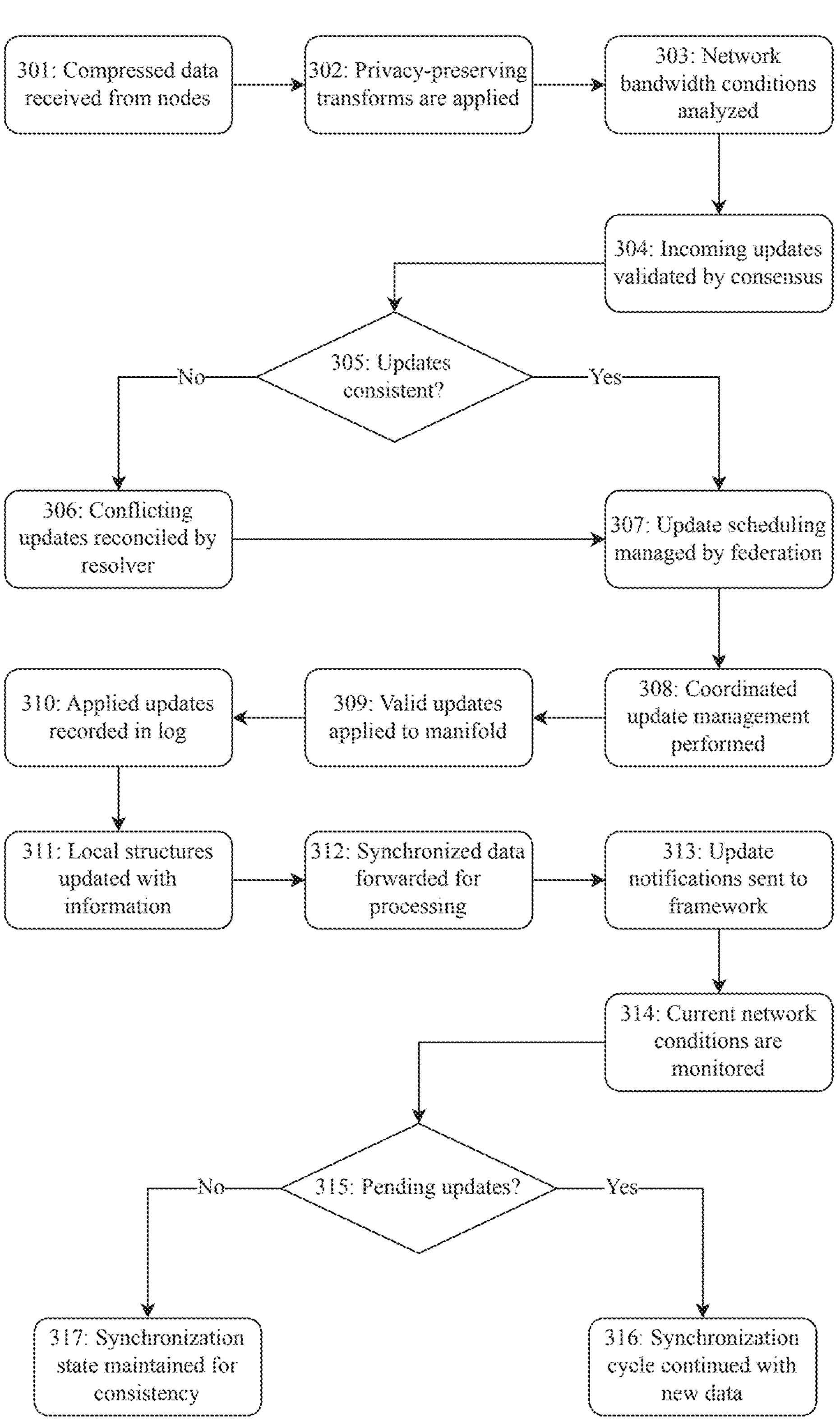
FIG. 3 is a flow diagram illustrating an exemplary method of distributed cognitive synchronization, where compressed cognitive data is received from multiple nodes, privacy-preserving transforms are applied, updates are validated and reconciled, synchronization logs are maintained, and synchronized data is forwarded for further processing.

FIG. 3 is a flow diagram illustrating an exemplary method of distributed cognitive synchronization in an adaptive cognitive processing system, in an embodiment. The method begins when a distributed cognitive synchronization layer 120 receives compressed cognitive data from multiple processing nodes across the distributed network 301. A privacy-preserving cognitive transform 121 applies differential geometric operations to the received compressed data to obscure operator-specific details while maintaining essential manifold relationships required for cognitive processing 302. A bandwidth-adaptive distributor 122 analyzes current network transmission conditions and adjusts compression granularity and data packaging to optimize distribution efficiency based on available bandwidth and latency constraints 303. A cognitive consensus engine 123 validates the incoming compressed updates by analyzing their consistency with existing manifold structures and verifying their integrity against established validation criteria 304.

The cognitive consensus engine 123 determines whether the received updates are valid and consistent with the current distributed cognitive state 305. When updates are determined to be invalid or inconsistent with existing manifold structures, the conflict resolver 125 initiates reconciliation procedures to address inconsistent manifold deltas and resolve conflicts between competing updates 306. A federation controller 124 manages update scheduling and coordinates the application of resolved updates to maintain proper sequencing and avoid race conditions 307. When updates are validated as consistent or after successful conflict resolution, a federation controller 124 proceeds with coordinated update management 308. The validated updates are applied to the local manifold structures, incorporating the new cognitive information while preserving geometric consistency 309.

A synchronization log 126 records all applied updates with timestamps and source identifiers to maintain auditability and enable rollback capabilities if needed 310. The local compressed manifold structures are updated to reflect the newly incorporated cognitive information while maintaining correlation preservation and geometric fidelity 311. The synchronized compressed cognitive data is forwarded to the compressed manifold processing engine 130 to enable immediate cognitive operations on the updated representations 312. The distributed cognitive synchronization layer 120 sends notification of applied updates to the adaptive learning and optimization framework 140 to inform performance monitoring and parameter adjustment processes 313. The system monitors current network conditions and processing load to prepare for the next synchronization cycle 314.

A federation controller 124 determines whether additional updates are pending processing in the synchronization queue 315. When more updates require processing, the method returns to receiving compressed data from multiple nodes to continue the synchronization cycle 316. When no additional updates are pending, the system maintains current synchronization state and waits for the next batch of updates while preserving distributed cognitive consistency 317.

Figure 4:
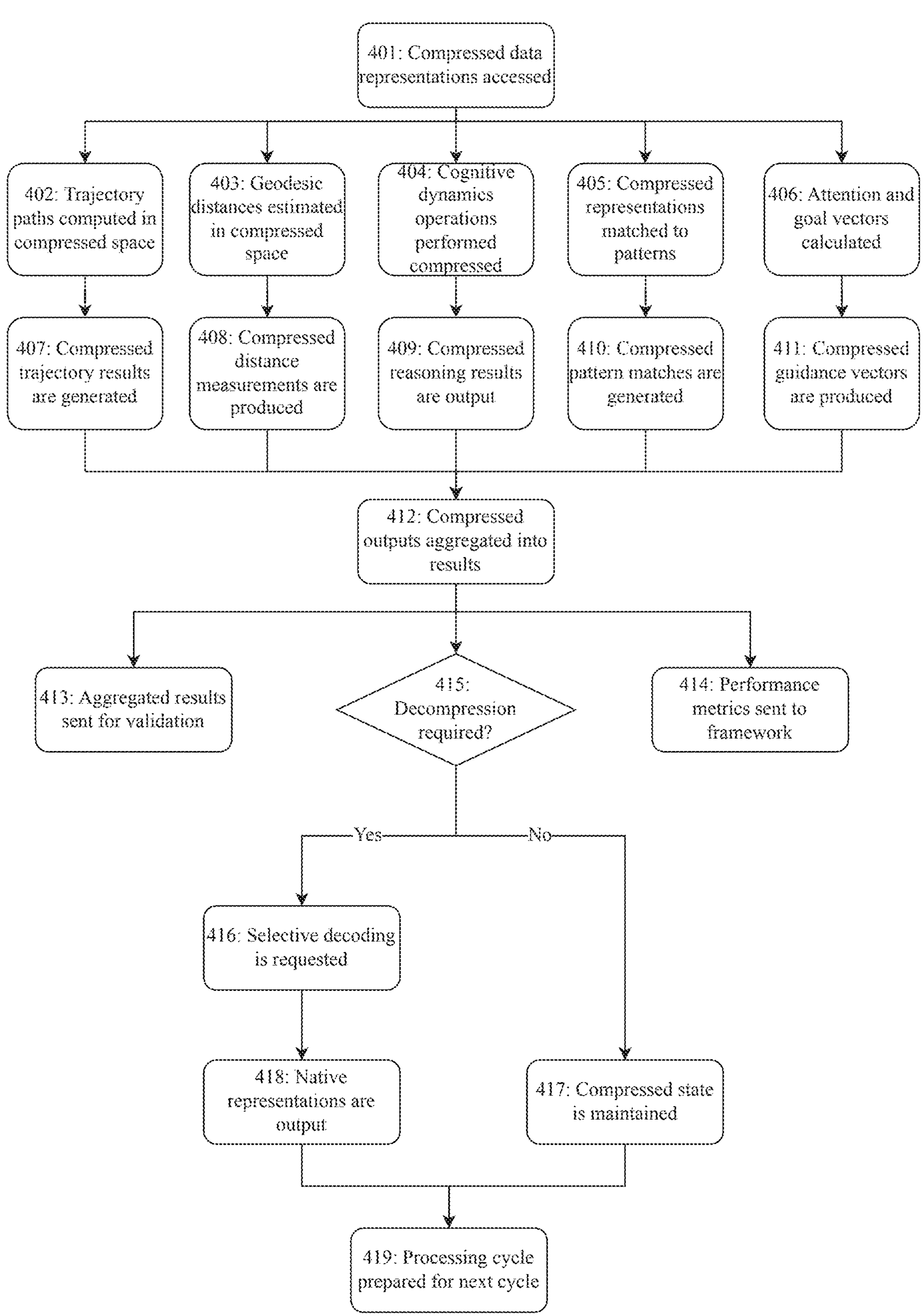
FIG. 4 is a flow diagram illustrating an exemplary method of compressed manifold processing, in which compressed data is used directly for trajectory computation, distance estimation, spatial reasoning, pattern matching, and guidance, with results aggregated, validated, and output for use in cognitive operations.

FIG. 4 is a flow diagram illustrating an exemplary method of compressed manifold processing in an adaptive cognitive processing system, in an embodiment. The method begins when a compressed manifold processing engine 130 accesses compressed cognitive representations from either a compressed representation buffer 115 or a distributed cognitive synchronization layer 120 401. A trajectory computation unit 131 receives the compressed representations and computes geometric paths corresponding to command intent directly in compressed space without requiring decompression 402. A geodesic distance estimator 132 processes the same compressed representations to evaluate similarity and proximity between compressed cognitive states using modified distance calculation algorithms 403. A compressed spatial reasoning unit 133 advances cognitive dynamics operations on the compressed data to maintain reasoning capabilities without decompression overhead 404. A compressed pattern matcher 134 analyzes the compressed representations to identify previously encountered patterns in compressed repositories for accelerated decision making 405. An attention and goal potential calculator 135 operates directly on compressed space to guide trajectory selection and cognitive focus based on compressed goal representations 406.

The trajectory computation unit 131 generates compressed trajectory results representing optimal paths through the compressed cognitive manifold 407. The geodesic distance estimator 132 produces compressed distance measurements quantifying relationships between cognitive states in compressed space 408. The compressed spatial reasoning unit 133 outputs compressed reasoning results from cognitive dynamics operations performed without decompression 409. The compressed pattern matcher 134 generates compressed pattern matches identifying similar cognitive states and behaviors from historical compressed data 410. An attention and goal potential calculator 135 produces compressed guidance vectors directing cognitive processing toward optimal outcomes 411. All processing units forward their respective outputs to a central aggregation point where compressed results are combined into a unified cognitive processing outcome 412.

The aggregated compressed results are output to a semantic integrity validation system 150 for geometric fidelity assessment and quality monitoring 413. Performance metrics including processing latency and accuracy measures are simultaneously output to the adaptive learning and optimization framework 140 for system optimization 414. The compressed manifold processing engine 130 determines whether decompression is required based on downstream processing requirements or quality assurance protocols 415. When decompression is required, the system requests selective decoding through the correlation-preserving decoder 118 to generate native representations 416. When decompression is not required, the system maintains compressed representation state for continued compressed-space operations 417. A correlation-preserving decoder 118 outputs native representations suitable for persistent cognitive machine integration when decompression has been requested 418. The system prepares for the next processing cycle by maintaining readiness for additional compressed cognitive operations 419.

Figure 5:
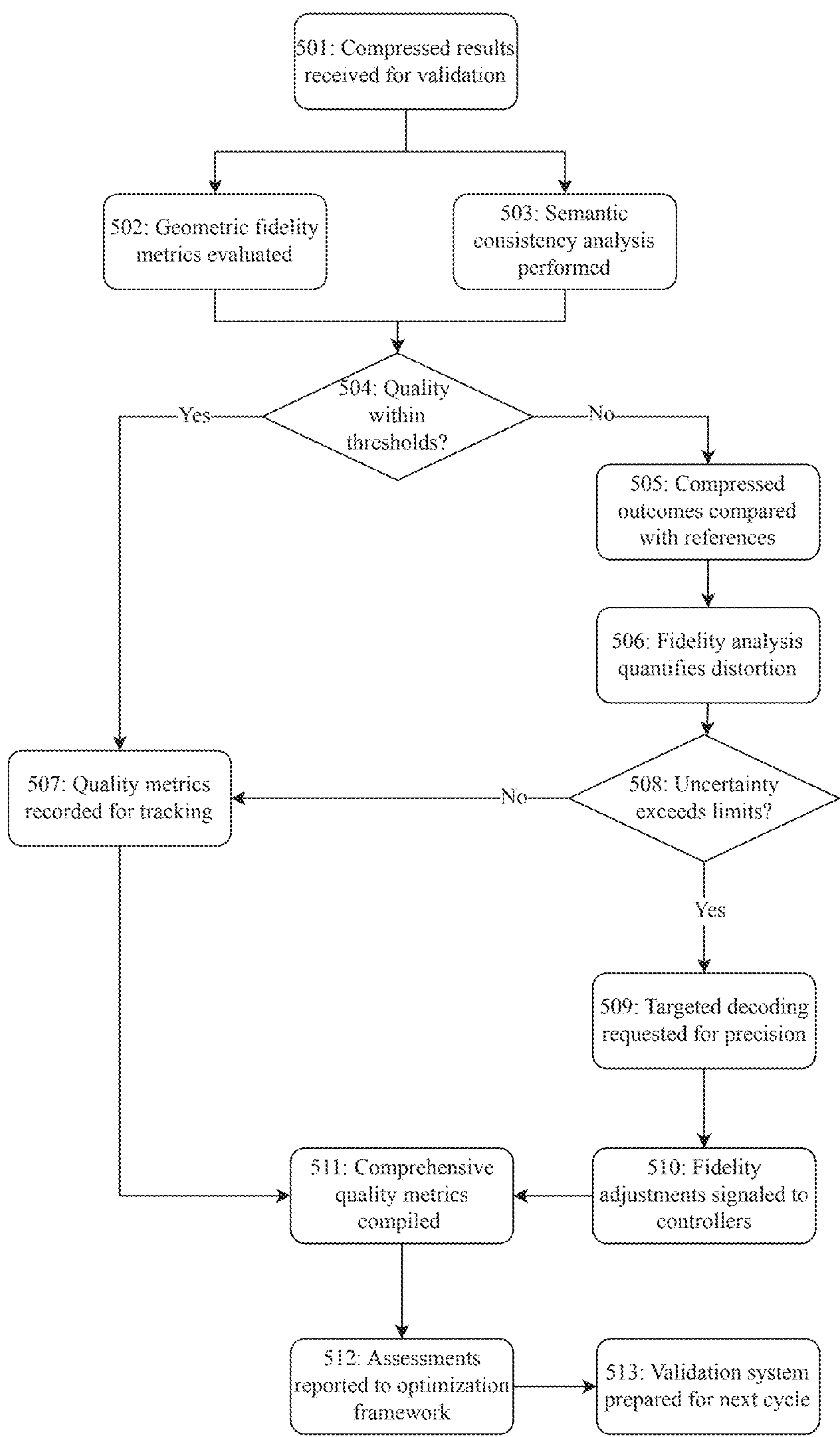
FIG. 5 is a flow diagram illustrating an exemplary method of semantic integrity validation, where compressed results are assessed for geometric fidelity and semantic consistency, compared against decompressed references if necessary, adaptive decompression is triggered when required, and quality metrics are recorded and reported.

FIG. 5 is a flow diagram illustrating an exemplary method of semantic integrity validation in an adaptive cognitive processing system, in an embodiment. The method begins when the semantic integrity validation system 150 receives compressed cognitive results from the compressed manifold processing engine 130 for quality assessment and fidelity monitoring 501. The geometric fidelity monitor 151 evaluates the compressed results to assess preservation of geodesic structure, local neighborhood relationships, and manifold connectivity in the compressed representations 502. The semantic consistency evaluator 152 simultaneously analyzes the compressed results to assess command interpretation consistency and intent preservation across compression and processing cycles 503. Both the geometric fidelity monitor 151 and semantic consistency evaluator 152 forward their assessments to determine whether overall quality metrics fall within acceptable thresholds for cognitive operation accuracy 504.

When quality metrics indicate that fidelity falls below acceptable thresholds, the differential comparator 153 initiates detailed analysis by comparing compressed-space outcomes against selectively decompressed reference data obtained from the correlation-preserving decoder 118 505. The differential comparator 153 performs comprehensive fidelity analysis to quantify the degree of uncertainty and geometric distortion present in the compressed cognitive operations 506. When quality metrics indicate acceptable fidelity levels, the system proceeds directly to record quality metrics for performance tracking and optimization 507. The differential comparator 153 determines whether the measured uncertainty in compressed operations exceeds configured safety limits that would compromise cognitive accuracy 508.

When uncertainty exceeds safety limits, the adaptive decompression trigger 154 requests targeted decoding of specific cognitive components to restore required precision for critical operations 509. When uncertainty remains within acceptable bounds, the system proceeds to record quality metrics without requiring decompression intervention. The adaptive decompression trigger 154 signals both the compression controller 116 and cognitive consensus engine 123 to adjust fidelity parameters and merge thresholds to prevent future quality degradation 510. The semantic integrity validation system 150 compiles and records comprehensive quality metrics including fidelity scores, consistency measures, and performance indicators 511.

The compiled quality assessments and performance metrics are reported to the adaptive learning and optimization framework 140 to inform compression parameter optimization and system adaptation strategies 512. The semantic integrity validation system 150 prepares for the next validation cycle by maintaining readiness to assess subsequent compressed cognitive processing results and ensure continued system reliability 513.

Figure 6:
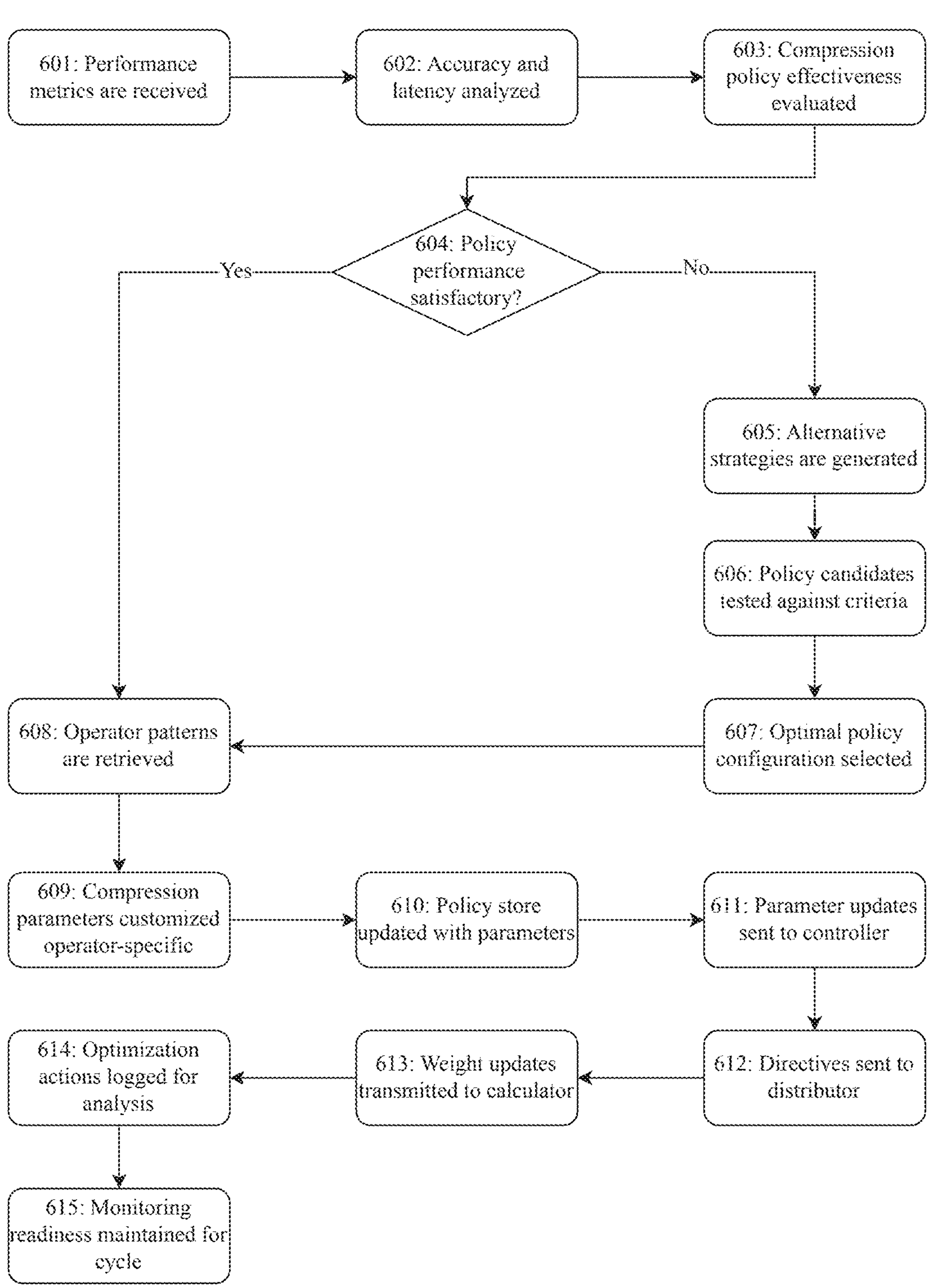
FIG. 6 is a flow diagram illustrating an exemplary method of adaptive learning and optimization, where performance metrics are collected, reinforcement learning is applied to improve compression policies, operator-specific adaptations are incorporated, updates are issued to subsystems, and optimization actions are logged.

FIG. 6 is a flow diagram illustrating an exemplary method of adaptive learning and optimization in an adaptive cognitive processing system, in an embodiment. The method begins when the adaptive learning and optimization framework 140 receives performance metrics including accuracy measurements and latency data from both the semantic integrity validation system 150 and the compressed manifold processing engine 130 601. The performance monitor 142 analyzes the collected accuracy and latency metrics to assess current system performance against established benchmarks and operational requirements 602. The reinforcement learning optimizer 141 evaluates the current compression policy effectiveness by comparing performance outcomes against expected results and policy objectives 603. The reinforcement learning optimizer 141 determines whether the current policy performance meets satisfactory criteria for cognitive operation accuracy and system efficiency 604.

When policy performance is determined to be unsatisfactory, the reinforcement learning optimizer 141 generates alternative compression strategies by exploring different parameter configurations and optimization approaches 605. The system tests the generated policy candidates against established performance criteria including accuracy thresholds, latency requirements, and resource utilization targets 606. The reinforcement learning optimizer 141 selects the optimal policy configuration that best meets current operational conditions and performance requirements 607. When policy performance is satisfactory or after optimal policy selection, the system retrieves operator-specific interaction patterns and preferences from the compression policy store 143 to enable personalized optimization 608. The operator adaptation unit 144 customizes the compression parameters and processing strategies to align with individual operator workflows and cognitive processing patterns 609.

The compression policy store 143 is updated with the optimized parameters and operator-specific adaptations to maintain current best practices for future use 610. The adaptive learning and optimization framework 140 issues parameter updates to the compression controller 116 to implement the optimized compression strategies in the cognitive state compression engine 611. Adjustment directives are sent to the bandwidth-adaptive distributor 122 to optimize data distribution strategies based on learned network performance patterns 612. Processing weight updates are transmitted to the attention and goal potential calculator 135 to improve cognitive guidance and trajectory selection based on optimization insights 613. The system logs all optimization actions and parameter changes for future reference and performance analysis 614. The adaptive learning and optimization framework 140 maintains monitoring readiness for the next performance feedback cycle to continue the continuous improvement process 615.

Figure 7:
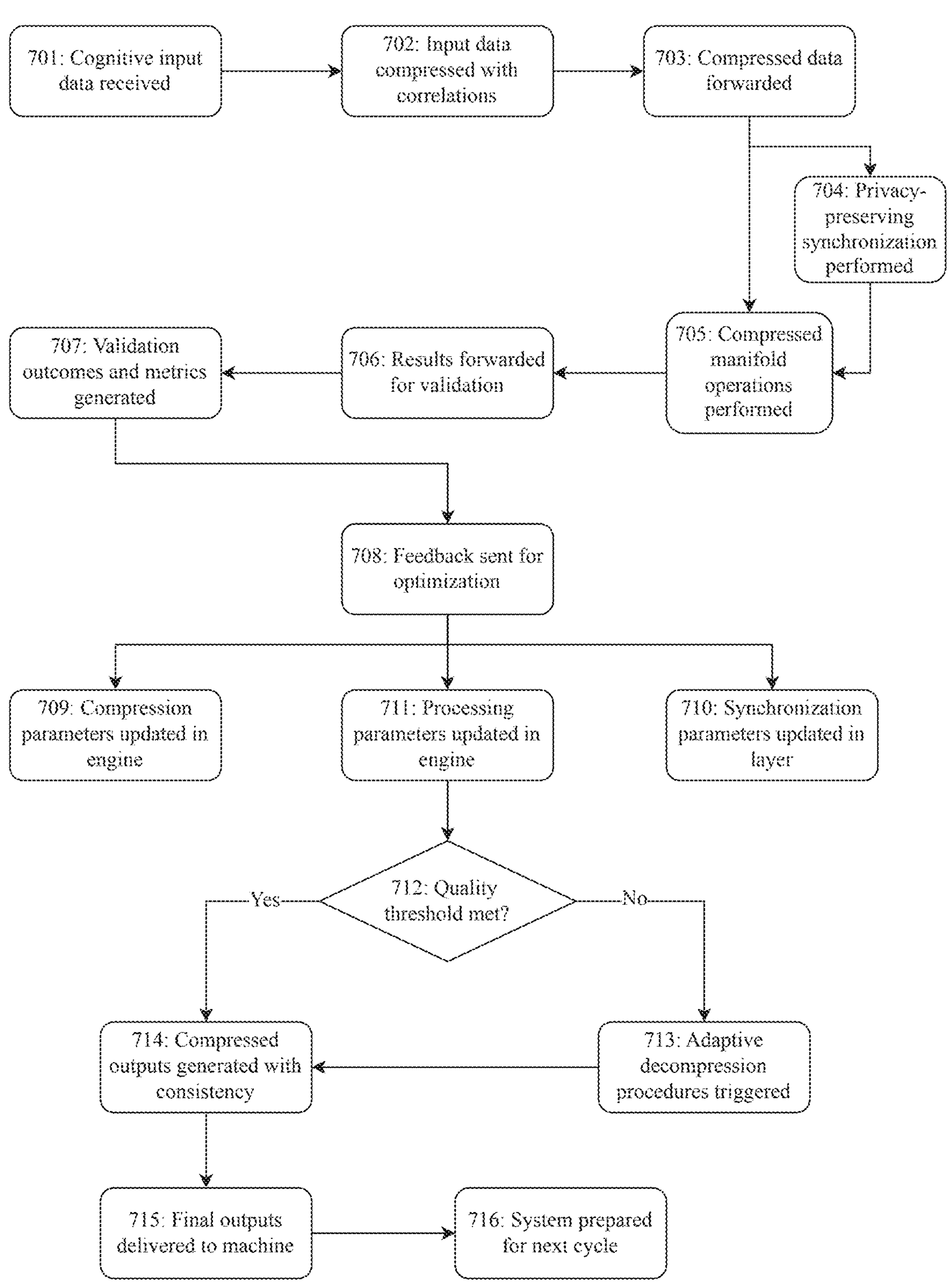
FIG. 7 is a flow diagram illustrating an exemplary end-to-end adaptive cognitive processing method, showing input reception, correlation-preserved compression, synchronization, compressed manifold operations, integrity validation, adaptive optimization, conditional decompression, and delivery of compressed outputs to a persistent cognitive machine.

FIG. 7 is a flow diagram illustrating an exemplary end-to-end adaptive cognitive processing method with correlation-preserved data compression, in an embodiment. The method begins when cognitive input data 101 is received from a persistent cognitive machine and forwarded to the cognitive state compression engine 110 for initial processing and correlation-preserved encoding 701. A cognitive state compression engine 110 processes the input data through specialized encoders and semantic correlation preservation to generate compressed cognitive representations that maintain geometric relationships essential for spatial reasoning 702. The compressed cognitive representations are simultaneously forwarded to a distributed cognitive synchronization layer 120 for federation across multiple processing nodes and to a compressed manifold processing engine 130 for direct cognitive operations 703. A distributed cognitive synchronization layer 120 applies privacy-preserving transformations and coordinates the sharing of compressed cognitive states across the distributed network while maintaining manifold integrity 704.

The compressed manifold processing engine 130 receives compressed representations from both the compression engine 110 and the synchronization layer 120 to perform trajectory computations, geodesic distance calculations, and spatial reasoning operations directly on compressed data without requiring decompression 705. The compressed processing results are forwarded to a semantic integrity validation system 150 for geometric fidelity assessment and semantic consistency evaluation 706. The semantic integrity validation system 150 analyzes the compressed processing outcomes and generates quality assessments and performance metrics for system optimization 707. The validation results and performance data are transmitted to an adaptive learning and optimization framework 140 for reinforcement learning and parameter optimization 708.

The adaptive learning and optimization framework 140 uses the received performance feedback to generate optimized compression parameters and issues these updates to the cognitive state compression engine 110 to improve future compression operations 709. Updated synchronization parameters are transmitted to the distributed cognitive synchronization layer 120 to optimize federation protocols and bandwidth adaptation strategies 710. Processing parameter updates are sent to the compressed manifold processing engine 130 to enhance cognitive operation accuracy and efficiency 711. The semantic integrity validation system 150 determines whether the compressed processing results meet established quality thresholds for cognitive accuracy and geometric fidelity 712.

When quality thresholds are not met, the system triggers adaptive decompression procedures to restore required precision for critical cognitive operations 713. When quality thresholds are satisfied or after adaptive decompression completion, the system generates compressed output results that maintain correlation preservation and geometric consistency 714. The final compressed cognitive outputs are delivered to the persistent cognitive machine 102 for integration with ongoing cognitive processes and operator interaction 715. The system completes the processing cycle and prepares for the next round of adaptive cognitive processing by maintaining readiness across all subsystems for continued operation 716.

Exemplary Computing Environment

Figure 8:
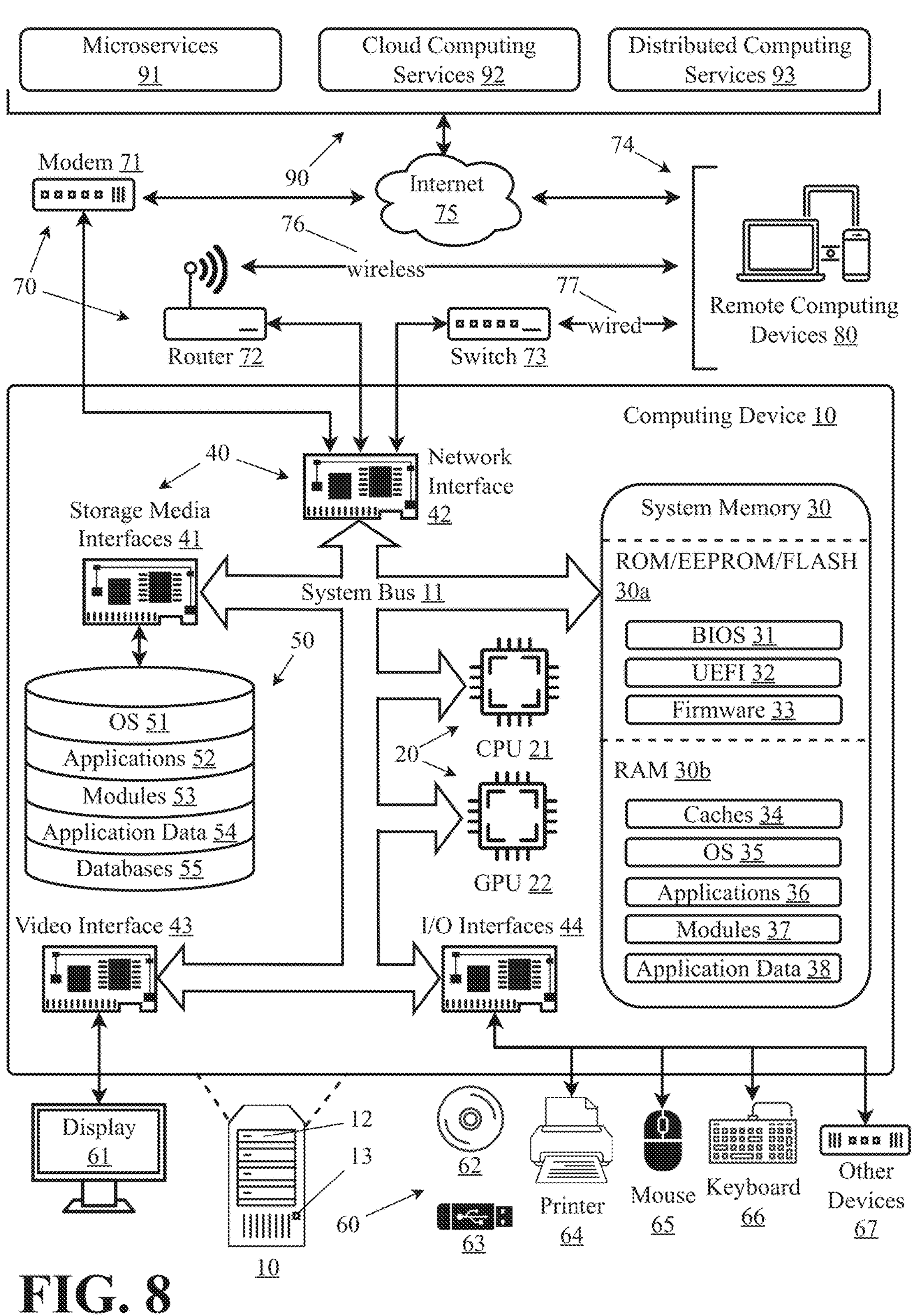
FIG. 8 illustrates an exemplary computing environment on which an embodiment described herein may be implemented.

FIG. 8 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system comprising a hardware memory, wherein the computer system is configured to execute software instructions stored on nontransitory machine-readable storage media that:

maintain a latent manifold as a geometric substrate for cognitive operations and command representation, wherein the latent manifold encodes system commands as nodes in geometric space with edges representing valid command sequences;

compress cognitive state data including command trajectories, operator interaction histories, and manifold structural parameters using correlation-preserving encoders that maintain geometric relationships essential for cognitive operations;

implement a compressed cognitive processing engine that performs trajectory computations, geodesic distance calculations, and spatial reasoning operations directly on compressed cognitive representations without requiring decompression;

maintain distributed synchronization of compressed cognitive states across multiple processing nodes while preserving geometric manifold properties through correlation-aware federation protocols;

restore geometric fidelity of cognitive operations by applying correlation networks to compressed cognitive data, wherein the correlation networks recover spatial relationships and semantic dependencies lost during compression;

adapt compression parameters based on cognitive processing requirements, wherein the system learns optimal correlation preservation strategies for different types of geometric manifold operations; and validate semantic integrity of compressed cognitive operations by monitoring preservation of geometric relationships and adjusting compression fidelity when cognitive accuracy thresholds are not maintained.

2. The computer system of claim 1, wherein the correlation-preserving encoders comprise specialized geometric encoders that preserve manifold curvature and geodesic distance relationships during compression of command trajectory data.

3. The computer system of claim 1, wherein the compressed cognitive processing engine performs trajectory computations directly in compressed latent space while maintaining geometric consistency within specified tolerances to uncompressed manifold operations.

4. The computer system of claim 1, wherein the distributed synchronization implements bandwidth-adaptive compression protocols that adjust correlation preservation strategies based on network transmission constraints.

5. The computer system of claim 1, wherein the correlation networks implement cross-modal correlation analysis to restore spatial relationships between compressed command trajectories and compressed operator context data.

6. The computer system of claim 1, wherein the compression parameter adaptation uses reinforcement learning algorithms to optimize correlation preservation based on cognitive operation accuracy feedback.

7. The computer system of claim 1, wherein the semantic integrity validation implements geometric fidelity metrics that quantify preservation of manifold properties and trigger adaptive decompression when accuracy thresholds are not maintained.

8. The computer system of claim 1, wherein the system further implements privacy-preserving transformations that enable secure sharing of compressed cognitive patterns between distributed processing nodes while maintaining geometric properties necessary for spatial reasoning operations.

9. The computer system of claim 2, wherein the specialized geometric encoders implement constraint-based loss functions that penalize geometric distortion to maintain local neighborhood structures essential for cognitive manifold operations.

10. The computer system of claim 1, wherein the system adapts compression strategies based on operator-specific cognitive processing patterns learned from historical interaction data to optimize correlation preservation for individual cognitive workflows.

11. A computer-implemented method for adaptive cognitive processing with correlation-preserved data compression, comprising:

maintaining a latent manifold as a geometric substrate for cognitive operations and command representation, wherein the latent manifold encodes system commands as nodes in geometric space with edges representing valid command sequences;

compressing cognitive state data including command trajectories, operator interaction histories, and manifold structural parameters using correlation-preserving encoders that maintain geometric relationships essential for cognitive operations;

implementing compressed cognitive processing that performs trajectory computations, geodesic distance calculations, and spatial reasoning operations directly on compressed cognitive representations without requiring decompression;

maintaining distributed synchronization of compressed cognitive states across multiple processing nodes while preserving geometric manifold properties through correlation-aware federation protocols;

restoring geometric fidelity of cognitive operations by applying correlation networks to compressed cognitive data, wherein the correlation networks recover spatial relationships and semantic dependencies lost during compression;

adapting compression parameters based on cognitive processing requirements, wherein optimal correlation preservation strategies are learned for different types of geometric manifold operations; and validating semantic integrity of compressed cognitive operations by monitoring preservation of geometric relationships and adjusting compression fidelity when cognitive accuracy thresholds are not maintained.

12. The method of claim 11, wherein the correlation-preserving encoders comprise specialized geometric encoders that preserve manifold curvature and geodesic distance relationships during compression of command trajectory data.

13. The method of claim 11, wherein the compressed cognitive processing performs trajectory computations directly in compressed latent space while maintaining geometric consistency within specified tolerances to uncompressed manifold operations.

14. The method of claim 11, wherein the distributed synchronization implements bandwidth-adaptive compression protocols that adjust correlation preservation strategies based on network transmission constraints.

15. The method of claim 11, wherein the correlation networks implement cross-modal correlation analysis to restore spatial relationships between compressed command trajectories and compressed operator context data.

16. The method of claim 11, wherein the compression parameter adaptation uses reinforcement learning algorithms to optimize correlation preservation based on cognitive operation accuracy feedback.

17. The method of claim 11, wherein the semantic integrity validation implements geometric fidelity metrics that quantify preservation of manifold properties and trigger adaptive decompression when accuracy thresholds are not maintained.

18. The method of claim 11, further comprising implementing privacy-preserving transformations that enable secure sharing of compressed cognitive patterns between distributed processing nodes while maintaining geometric properties necessary for spatial reasoning operations.

19. The method of claim 12, wherein the specialized geometric encoders implement constraint-based loss functions that penalize geometric distortion to maintain local neighborhood structures essential for cognitive manifold operations.

20. The method of claim 11, further comprising adapting compression strategies based on operator-specific cognitive processing patterns learned from historical interaction data to optimize correlation preservation for individual cognitive workflows.

* * * * *